Figure 2A:
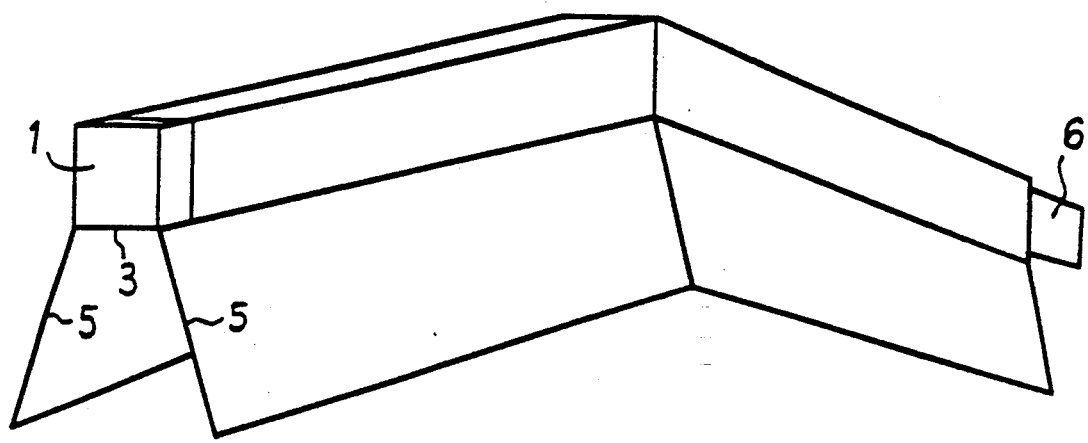

United States Patent [19]
Fonsny

[11] Patent Number: 5,424,745
[45] Date of Patent: Jun. 13, 1995

[54] DETECTION METHOD AND SYSTEM

[75] Inventor: Paul Fonsny, Louvain-la-Neuve, Belgium

[73] Assignee: Ccoms Sprl, Louvain-la-Neuve, Belgium

[21] Appl. No.: 53,257

[22] Filed: Apr. 28, 1993

[30] Foreign Application Priority Data

Apr. 29, 1992 [BE] Belgium .............................. 09200395

[51] Int. Cl.6 ............................................. G01S 13/00
[52] U.S. Cl. ......................................... 342/28; 342/27
[58] Field of Search ................................ 342/28, 27

[56] References Cited

U.S. PATENT DOCUMENTS

| 3,392,388 | 7/1968 | Nakahara et al. | |
|---|---|---|---|
| 3,680,085 | 7/1972 | Del Signore | |
| 3,713,156 | 1/1973 | Pothier | 342/22 |
| 3,890,615 | 6/1975 | Moran | |
| 4,180,817 | 12/1979 | Sanford | 343/854 |
| 4,991,146 | 2/1991 | Ransdell et al. | |
| 5,192,954 | 3/1993 | Brockelsby et al. | 342/42 |

FOREIGN PATENT DOCUMENTS 2160274 of 1971 France .

OTHER PUBLICATIONS

"Obstacle Detecting System"; Patent Abstracts of Japan; Mar. 29, 1979.

*Primary Examiner*—Mark Hellner
*Attorney, Agent, or Firm*—Leydig, Voit & Mayer

[57] ABSTRACT

The invention provides a method and a system for the detection of an object moving relative to another object. The object possibly being a person, an element, an installation, a tool, a surface, etc. According to the invention, a UHF wave is generated in a slotted antenna and the rays exiting from the slots are directed onto the area to be monitored. The reflected waves are detected and this frequency is compared with the frequency of the transmitted waves.

9 Claims, 6 Drawing Sheets

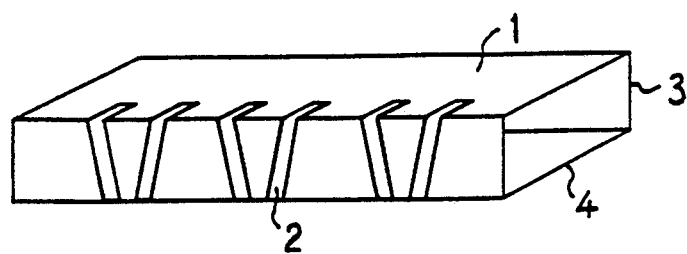
FIG. 1a
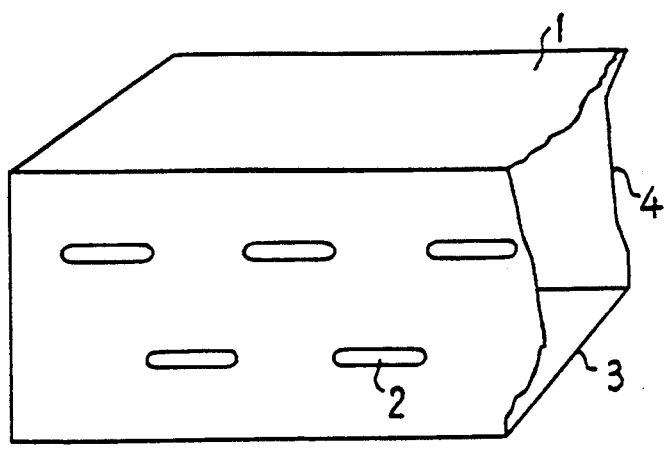
FIG. 1b
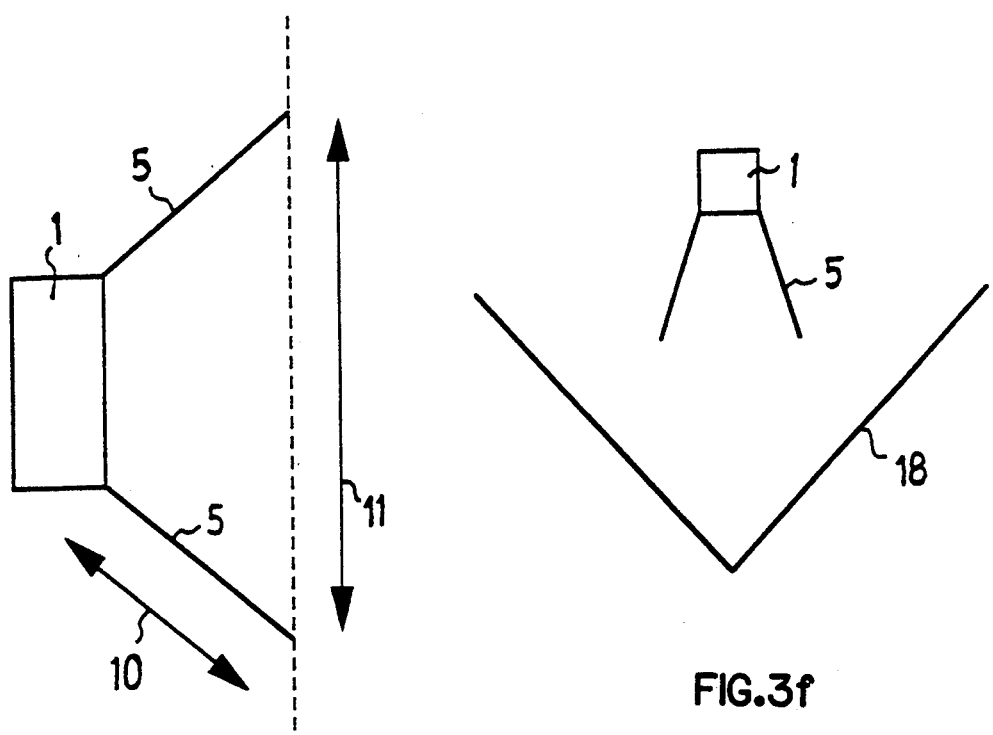
FIG. 3a
FIG. 3f

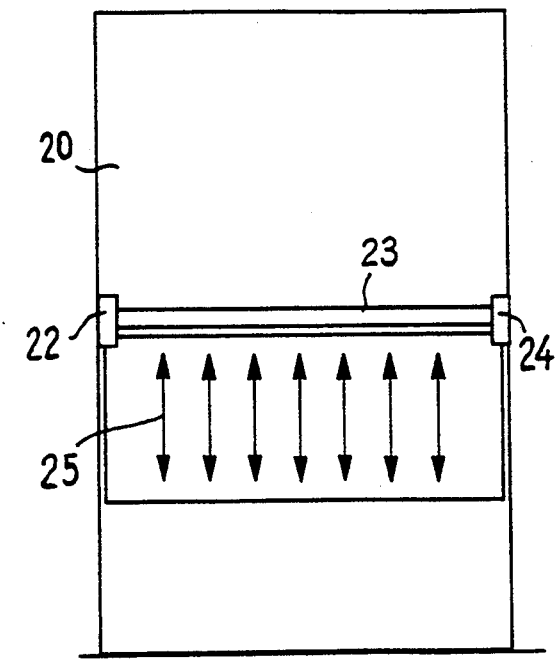
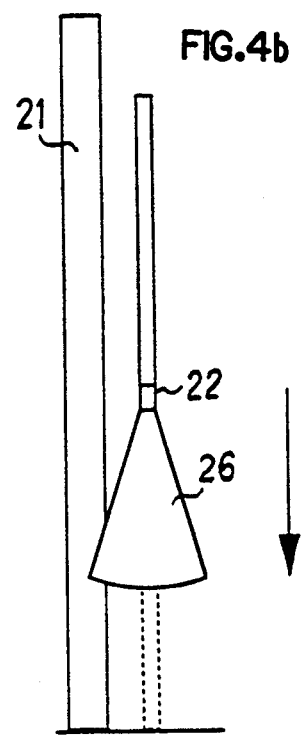
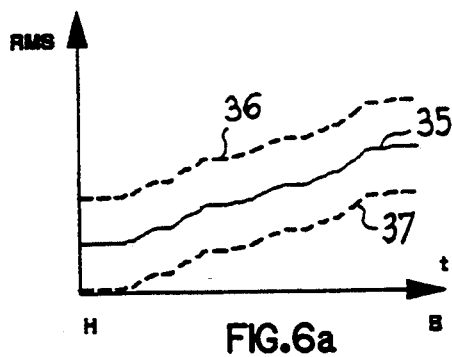
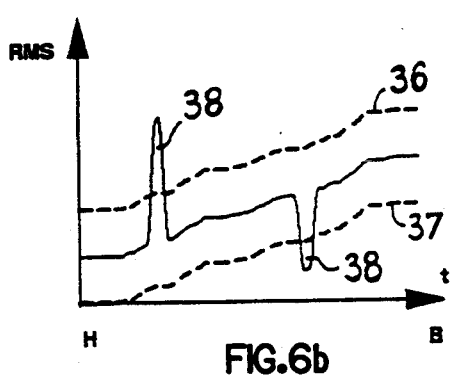
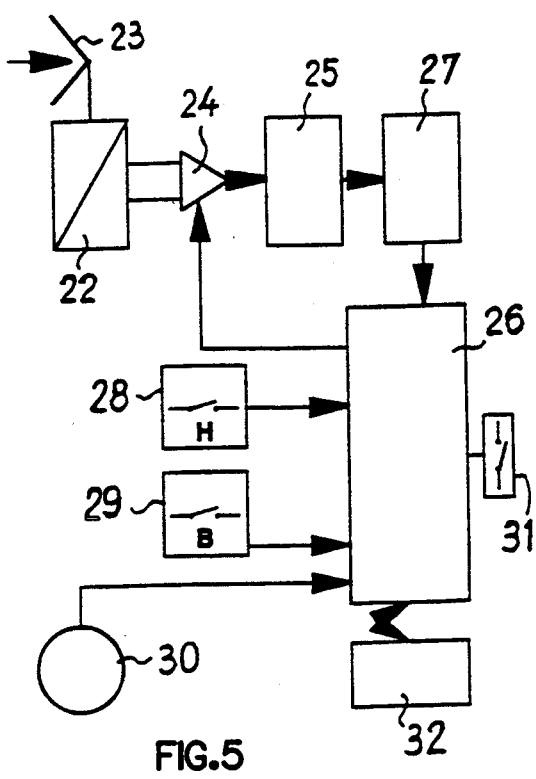

DETECTION METHOD AND SYSTEM

The present invention relates to the field of the detection of an object moving relative to another object, in which each object may be a person, an element, a surface, an installation, a machine, a tool, etc.

In particular the invention relates to the detection of a danger possibly emanating from an object, from a person, from a machine, from a tool, from an installation, from a surface, etc.

It is known to detect objects by several systems.

Detection by light barrier, such as applied in lifts or sliding doors is well known. The surface protected by this barrier is, however, very restricted, and the hand of a person, for example, or the fork of a truck risks not being seen.

Another detection system is based on the use of an active or passive infrared signal. The infrared rays are, however, disturbed by the heat and the color of the environment.

Yet another system uses a microwave radar coupled to a horn antenna. This system does not allow a substantial surface area to be monitored, given the conical shape of the horn. It is therefore necessary to place several radars in series, which gives rise to expensive equipment as well as to areas of shadows, that is to say unprotected areas. This system, moreover, has the drawback that it does not allow parallel traffic to be rejected. In effect, the wave lobe formed by a radar with a horn antenna has a pyramidal shape, which does not allow a target heading parallel to the surface to be protected to be distinguished from a target heading towards this surface.

The object of the present invention is to provide a detection method and system which eliminates the drawbacks of the known systems. In particular, the invention provides a method and a system which detects a person or an object which is heading towards the protected area without detecting the parallel traffic.

It has been found that this objective may be achieved by using a generator of microwaves coupled to a slotted antenna.

A slotted antenna consists of a series of slots cut in a waveguide according to known principles and is described in the specialized works dealing with the use of microwave.

A slotted antenna, although described in the literature, is only very rarely used at present and finds its applications in the field of guidance for military and space missiles. In this case, a series of slotted antennae is generally coupled in order to be able to operate correctly.

However, it has been found that a slotted antenna has the virtue of being able to distinguish traffic heading towards the protected surface from traffic parallel to this surface.

When a microwave signal is generated in a slotted antenna, this signal gives rise to a multidirectional radiation lobe in the transverse direction with respect to the waveguide. The aperture of the lobe is, however, relatively wide (about 70° to 80° at −3 dB).

Given that the waves are heading in every direction, the signals detected might, for certain applications, include too many parasites and not give precise detection. In the case where multidirectional radiation would constitute a drawback for precise detection using a slotted antenna, it is proposed, according to an advantageous application of the invention, to steer the waves and to orient the radiation lobe onto the surface to be monitored and thus to limit the detected signals to the desired signals.

According to this advantageous application one or more lateral reflectors are added to the slotted antenna, so allowing the directional and radiation characteristics of the antenna to be modified at will. In practice, the use of a reflector concentrates the radiation lobe and thereby increases the sensitivity, the radiation lobe becomes a portion of a cylinder, shaped like a wedge of cake as illustrated below.

The reflectors used will preferably be plane but may also have a hyperbolic or parabolic shape if the radiation characteristics allow it.

It is clear that the length of the reflectors and their spacing determine the characteristics of the antenna according to the invention.

The reflectors may be fixed or movable, for example pivoting or telescopic.

The reflectors may also be symmetric or asymmetric.

So as to allow the desired detection, the slotted antenna, possibly provided with one or more reflectors and with a microwave generator, will be completed by a detector and a data processing circuit as well as by an alarm and/or intervention system.

Figure 8:
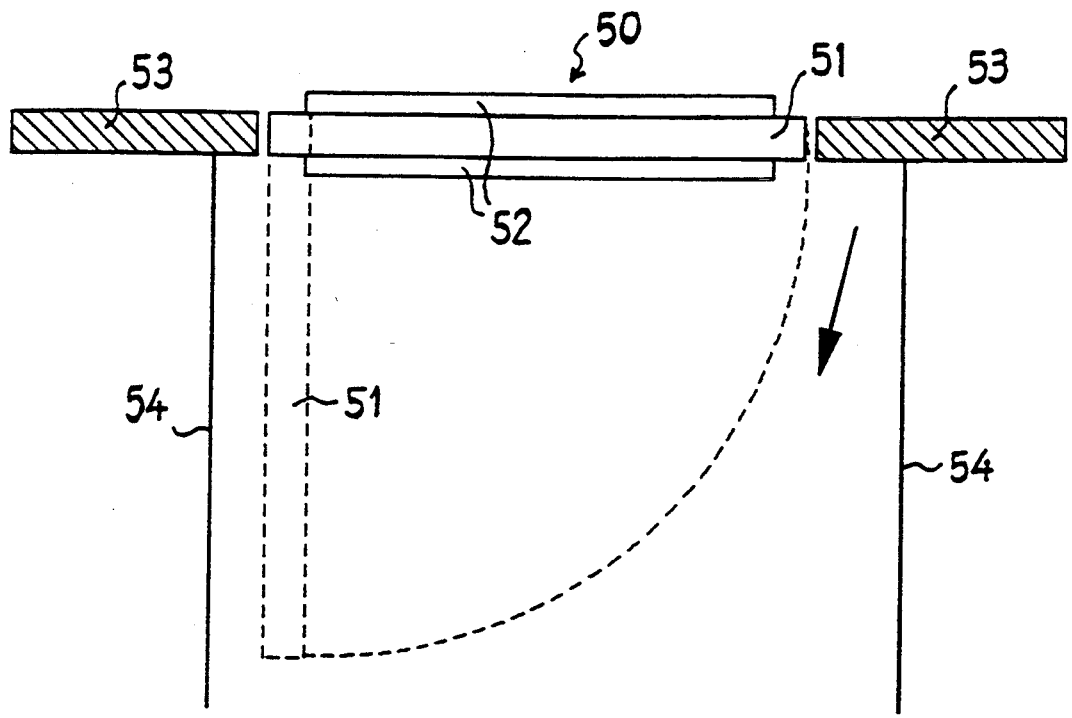
Figure 2B:
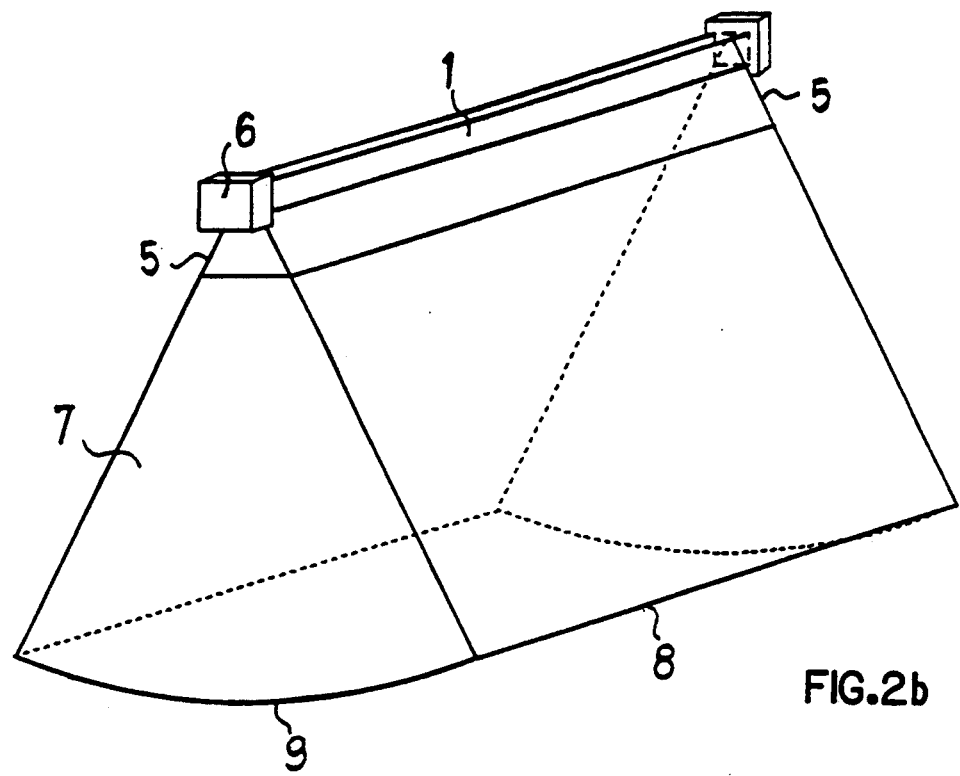
Figure 7A:
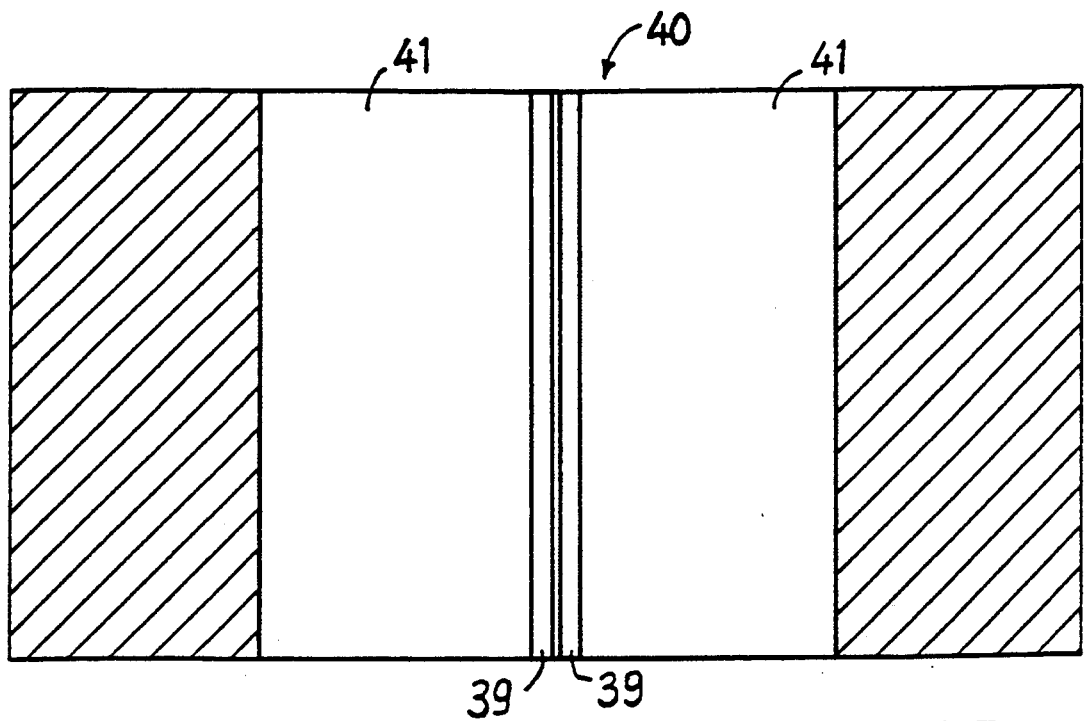
Figure 7B:
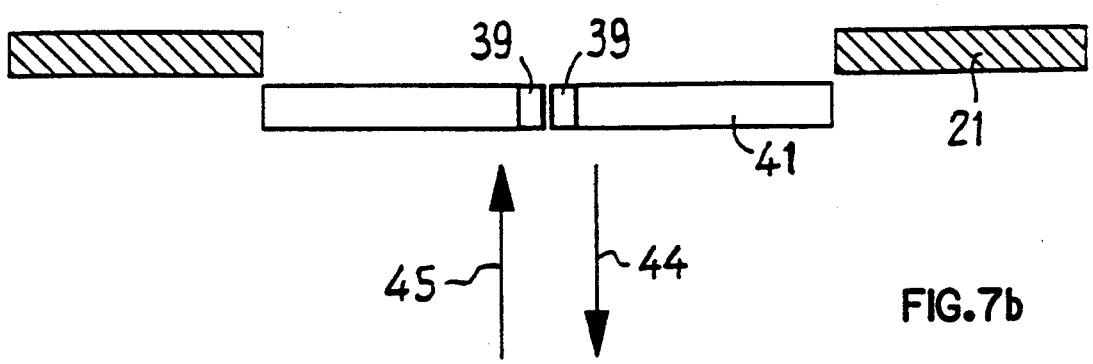
Figure 9:
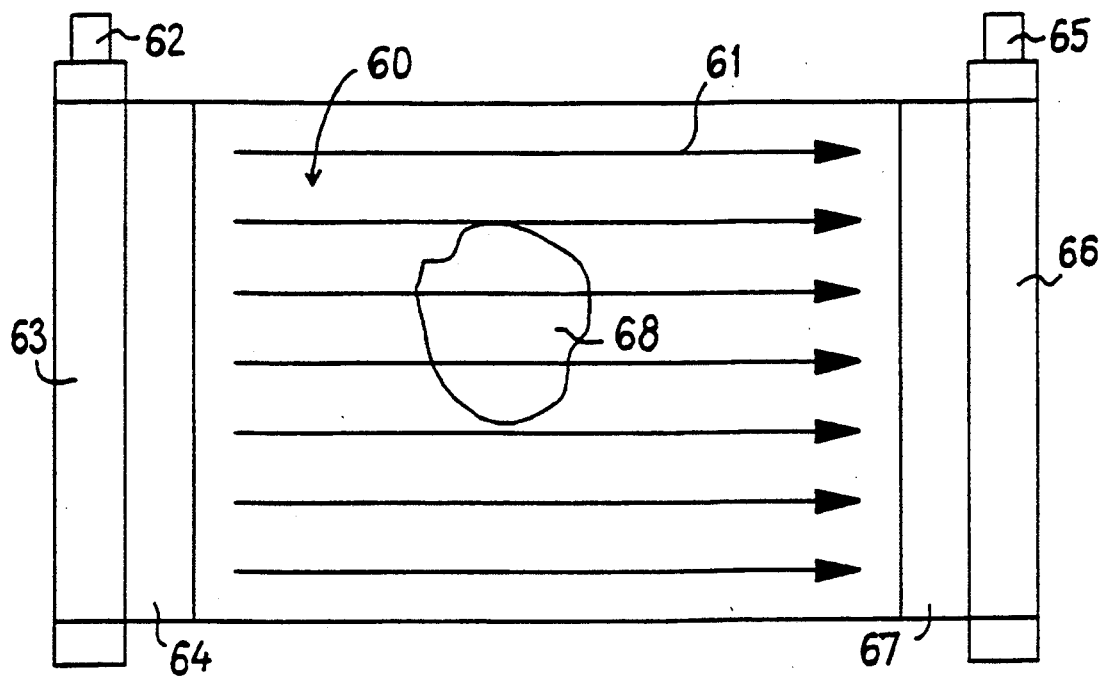
Figure 10:
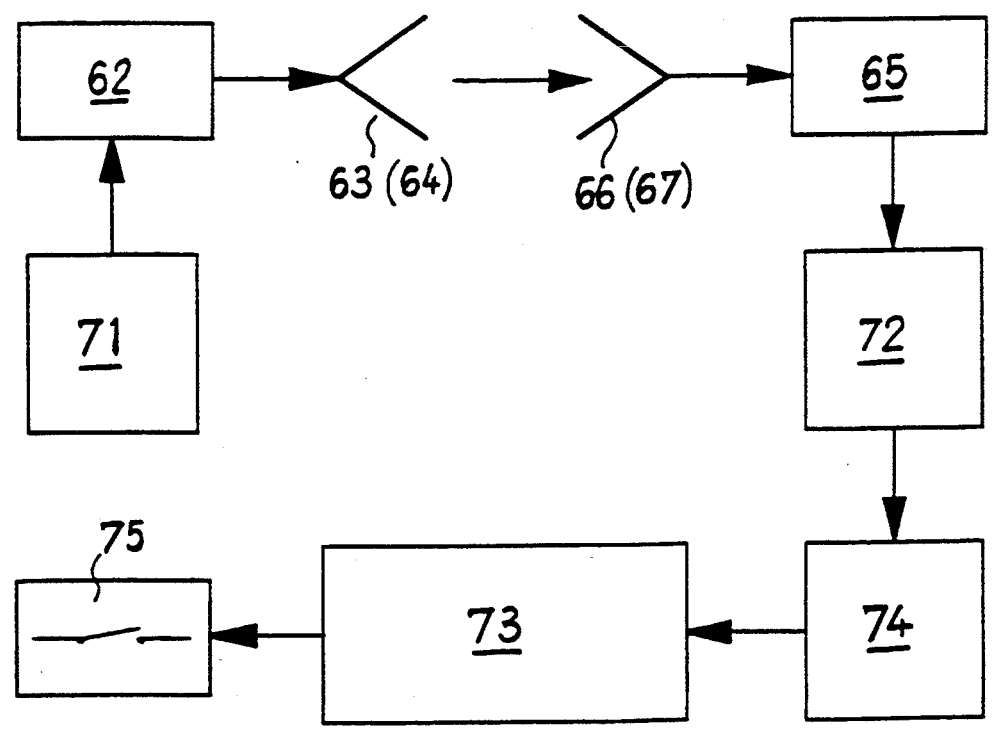

The invention will be described below in more detail with the aid of several methods of application by referring to the attached figures which represent:

FIGS. 1a and 1b, perspective views of a part of a waveguide of a slotted antenna;

FIG. 2a, a perspective view of a waveguide with two reflectors;

FIG. 2b, a perspective view of the radiation lobe of a slotted antenna with reflectors;

FIG. 3a–3f, diagrams showing sections in several methods of application of a reflector;

FIGS. 4a and 4b, diagrams giving a plan and a sectional view of a first application;

FIG. 5, a block diagram of an electronic circuit used in the context of the application according to FIG. 4;

FIGS. 6a and 6b, two diagrams illustrating the application according to FIG. 4;

FIGS. 7a and 7b, diagrams giving a plan and a sectional view of a second application;

FIG. 8, a diagram giving a plan and sectional view of a third application;

FIG. 9, a diagram giving a plan view of a fourth application;

FIG. 10, a block diagram of an electronic circuit used in the context of the application according to FIG. 9.

FIGS. 1 shows perspective views of a part of a waveguide 1 of a slotted antenna. In FIG. 1a, the slots 2 are cut into the small side 3 of the waveguide 1 of rectangular cross-section. In FIG. 1b, the slots 2 are cut into the large side 4 of the waveguide 1 of rectangular cross-section. The waveguide may have a straightline shape, a curved shape, a folded shape or any necessary shape; however, for guiding the waves, the cross-section of a waveguide will preferably, but not necessarily, be rectangular.

FIG. 2a shows a waveguide 1 provided with two reflectors 5, and with a microwave generator 6.

FIG. 2b shows a slotted antenna, comprising the microwave generator 6, the waveguide 1, two reflectors 5 and the radiation lobe 7. This FIG. 2b shows that the radiation lobe is a portion of a cylinder (a cylinder whose generatrix is the straight line 8 and whose directrix is the circle formed by the curve 9). The portion of the cylinder resembles a wedge of cake. This radiation lobe 7 entirely covers—with no shadow area—the detection space delimited by the reflectors 5.

FIGS. 3 show several types of reflectors.

FIG. 3a represents a transverse section of a waveguide 1 with two plane reflectors 5. The arrows 10 and 11 respectively indicate the length of the reflectors and the spacing of the reflectors. The length and the spacing of the reflectors determine the characteristics of the antenna. It should also be noted that the use of reflectors increases the sensitivity of the antenna and/or reduces the power necessary. In fact, the smaller the spacing 11, the stronger the radiation and vice versa.

Figure 3B:
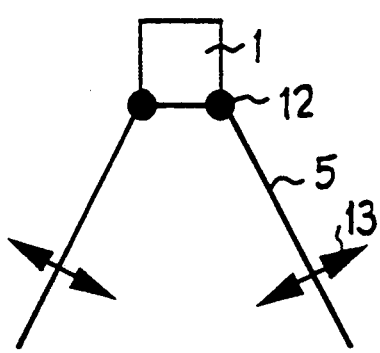

FIG. 3b shows an application of reflectors 5 capable of pivoting around axes 12; the arrows 13 indicate the movement of the reflectors. This type of reflector may be useful in the case where the area to be surveyed is not always the same.

Figure 3C:
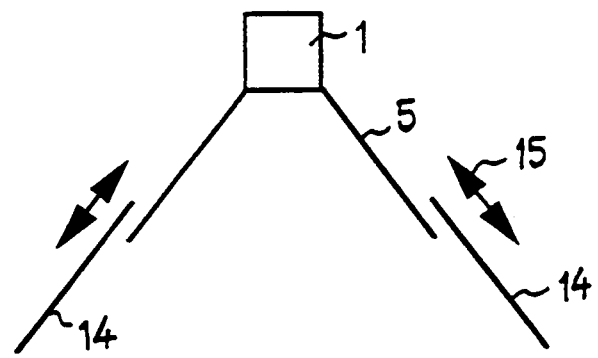

FIG. 3c shows telescopic reflectors 5. Each reflector can be considered as including a fixed part 5 and a movable part 14 attached to the fixed part by means of a guide system (not illustrated). This system can be of any sort, such as dovetailed, notched, with springs etc.

The movable part 14 can move in the direction of the arrows 15 with respect to the fixed part 5; this movement can be done in steps or continuously.

Figure 3D:
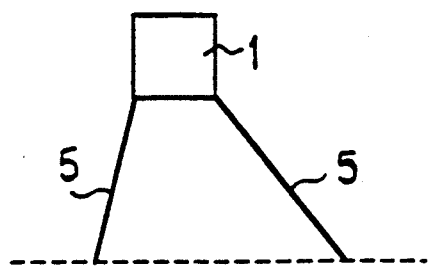
Figure 3E:
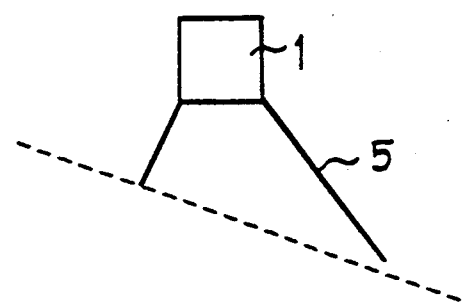

FIGS. 3d and 3e show reflectors for asymmetric radiation lobes. Accord g to FIG. 3d, the angle formed by the two reflectors 5 with the waveguide 1 is different, in FIG. 3e the reflectors 5 each have a different length.

It is possible to further increase the directivity of the waves by using a folded horn, which can be done without increasing the overall size. FIG. 3f shows a slotted antenna 1 with reflectors 5 coupled to a complementary reflector 18.

Various other types of reflectors may be used in the context of the invention: they may be hyperbolic, parabolic, plane with a hyperbolic or parabolic part, etc.

In the drawings, two reflectors have been represented each time for simplicity; it is clear that for numerous applications a single reflector may suffice. In other cases, it may be advantageous to use three or more reflectors.

FIG. 4 shows the application of a slotted antenna used for surveillance of a sectional gate. This type of gate consists generally of several leaves linked together by articulations and moves in the vertical direction. The operation of this type of gate is accompanied by a system which stops the gate when an object or a person is detected in its way.

The systems used up to now are based on the infrared barrier and/or on a system of feeler bars, acting by contact.

A slotted antenna according to the invention will advantageously be able to replace the existing systems.

FIG. 4a shows a plan view of the gate 20 placed in front of an outer wall 21. FIG. 4b depicts a cross-section.

The lower part of the gate is equipped with a detector system according to the invention including a transmitter receiver 22, a slotted antenna 23 and a load 24 which tunes the characteristic impedance of the antenna. Advantageously the slotted antenna 23 may be equipped with reflectors. The arrows 25 show the direction of the movement of the gate. As the gate descends, the transmitter 22 generates a microwave signal which is guided via the slotted antenna and which directs its detection lobe 26 downwards. The detection is based on the Doppler effect.

FIG. 5 shows the electronic circuit.

The transmitter receiver cell 22 generates a microwave signal which is radiated into space by virtue of the slotted antenna 23. According to the Doppler effect, any person or any object in relative movement under the detector brings about a variation in the frequency of the incident wave.

This reflected wave is picked up by the antenna 23 and mixed in the transmitter receiver 22.

At the output of the transmitter receiver cell 22, there will be a low-frequency Doppler signal whose frequency is proportional to the relative speed of the detected object and whose amplitude is proportional to the size and to the proximity of the detected object.

The Doppler signal is applied to a programmable-gain amplifier 24. In order to avoid saturation, the gain of the amplifier is reduced in proportion as the gate approaches the ground. Next the RMS value of the Doppler signal is calculated by virtue of the RMS circuit (25) which calculates the RMS value.

Before arriving at the microprocessor 26, the RMS value of the Doppler signal is converted into a digital signal by virtue of the analog/digital converter 27. The circuits 28 and 29 are high and low end-of-travel contacts of the gate. The reference numeral 30 represents a coder which gives the relative or absolute position of the gate and 31 an output relay or any other output interface. Reference 32 is a permanent memory for backing up the signature, for example non-volatile RAM.

The detection algorithm according to the invention is based on signature recognition.

On installation of the gate, the installer causes the gate to descent once. As the detector is fixed to the gate, it therefore sees the ground and the environment in the vicinity. The system according to the invention then records the signal (FIG. 6a).

The signal 35 thus constitutes the signature of the gate and its environment. The microprocessor then calculates detection templates 36 and 37. The signature 35 and the detection templates 36, 37 are stored in the permanent memory. The system is then operational.

On each descent of the gate, the system according to the invention continuously compares the Doppler signal measured in real time with the signature stored in memory. If the deviation overshoots the detection threshold 36 or 37 (FIG. 6b), the microprocessor triggers the output relay 31, the gate rises and the system is ready for the next detection. The spikes 38 (FIG. 6b) show obstacles detected.

The end-of-travel contacts 28 and 29 allow synchronization between the signature and the signal measured in real time. Better precision is obtained with the incremental or absolute coder 30 which gives a synchronization signal.

It is important to note that the microwave detector used is not influenced by the nature, the color and the reflecting power of the ground. It is not sensitive to light radiation, nor to differences in luminosity between outer and inner part of the gate, nor to air currents, nor to ambient noises.

FIG. 7 shows a plan view (7a) and a cross-section (7b) of a sliding gate 40.

The sliding gate 40 consists of two leaves 41 which move horizontally.

According to the invention, protection is provided for the gate by installing, on each leaf 41, a protection device 39 similar to that described in the preceding example, that is to say a transmitter/receiver and a slotted antenna.

The Doppler-effect microwave detector according to the invention makes it possible to reject the traffic of the persons (or vehicles) passing parallel to the gate. To this end, the phase shift between two signals is detected.

A microwave cell with two mixers supplies two low-frequency Doppler signals wherein the phase shift between these two signals depends on the direction of movement of the object detected. With a suitable electronic circuit, it is therefore possible to know whether an object is approaching or leaving the detector and thereby to open the door only for persons who wish to enter.

Consequently, persons passing parallel (arrows 42, 43) to the gate and persons exiting (arrows 44) do not give a correct phase shift and the gate remains closed. Only persons wishing to enter (arrows 45) create a correct phase shift between the two Doppler signals and thereby bring about opening of the gate.

FIG. 8 shows the method according to the invention applied to a pivoting gate 50, consisting of one leaf 51 which pivots around an axis of rotation.

To this end, on each side of the leaf 51 is installed a protection device 52 (slotted antenna), preferably equipped with reflectors, similar to that described in the example of the sectional gate.

The combination of the slotted antenna and the detection algorithm based on signature recognition makes it possible to protect the entirety of the surface covered by the leaf despite the presence of the walls 53 and the barriers 54.

FIG. 9 shows yet another application of the method and system according to the invention and relates to the protection of any object or surface with the aid of an intangible curtain obtained by the use of a slotted antenna.

The figure shows the curtain 60 represented by arrows 61 and formed by a transmitter 62 of microwave which are guided in a slotted antenna 63 provided with reflectors 64.

The transmitter 62 is placed facing a receiver 65 also equipped with a slotted antenna 66 with reflectors 67. The curtain comprises an electronic processing circuit which carries out acquisition of the signal generated by the transmitter 62.

The wave emitted in a homogenous way by the slotted antenna 63 constitutes a sort of intangible curtain. If any object 68 is present in this surface to be protected, the electronic circuit detects this presence and sends a stop signal.

FIG. 10 shows a block diagram of the various elements constituting the complete system.

The transmitter 62 generates a microwave signal which is radiated into space by virtue of the slotted antenna 63 with reflectors 64. This microwave signal is modulated by the modulator 71. The modulation can be by amplitude or frequency, or by any other modulation method known to the person skilled in the art. This radiated wave is picked up by the antenna 66 of the receiver 65. This signal is next demodulated by the demodulator 72.

Before sending to the microprocessor 73, the signal is converted into a digital value by virtue of the analog-digital converter 74.

The microprocessor 73 records this value as a reference value which corresponds to the absence of any object in the surface to be protected of the system.

If an object appears in the surface and brings about a variation in the signal which overshoots the predetermined detection template the microprocessor triggers the output relay 75 or any other output interface.

This protection application may be used for the safety of operators of a machine, for protection of a tool, installation or object or in general for detection and protection of any dangerous event or of any surface.

It is important to note that the microwave curtain used is not disturbed by the nature, the color, and the radiating power of the ground. It is not sensitive to light radiation, nor to air currents, nor to ambient noises. It is less sensitive to rain.

Several other applications are possible, hence, for example, it is possible to use the system for surveillance or control of road traffic, it is possible to count the number of vehicles passing in one direction, it is possible to control the traffic lights and thereby to regulate the traffic. It is even possible, by incorporating the slotted antenna in the bumper of a vehicle, to apply the method as an anti-collision system. The addition of a modulator/demodulator allows data (identification, relative speed etc.) to be passed between detectors of different vehicles.

The field of application of the use of a slotted antenna, preferably with reflectors, may also extend to docking systems, to approach systems, to the protection of lock gates, the protection of large machines, such as trimming machines, large presses, rolling mills, etc., the protection of the trackway of traveling cranes and in general any movement by an object, machine or person.

It is clear that the invention may be applied with or without reflectors. When, however, the radiation lobe of the slotted antenna is too wide for the surface area on the object or the person to be monitored, reflectors will preferably be used.

I claim:

1. A method of detection of an object moving relative to another object comprising the steps of:
generating microwaves using a slot antenna, the slot antenna including a rectangular wave guide having a plurality of faces where a plurality of slots are disposed in at least one of the plurality of faces;
directing microwaves through the plurality of slots towards the area to be surveyed using one or more reflectors, detecting the frequency of reflected waves resulting from an object in relative movement in the survey area and
comparing the frequency of the reflected waves with the frequency of the waves transmitted.

2. The detection method as claimed in claim 1, further comprising the steps of storing reference data corresponding to the frequency of the waves transmitted when no object is present in the survey area in memory, and comparing the frequency of the reflected waves with the frequency of the transmitted waves and generating a signal if the reflected waves do not correspond to the reference data.

3. A system for detecting an object moving relative to another object comprising:
a microwave transmitter;
a slotted antenna including at least one reflector, said slotted antenna being connected to said microwave generator said slotted antenna including a rectangular wave guide having a plurality of faces where a plurality of slots are disposed in at least one of the plurality of faces;

at least one receiver for receiving waves reflected from the objects;

means for receiving transmitted waves and for storing reference data corresponding to the frequency of the transmitted waves in memory;

means for comparing the reflected wave data; and a signaling circuit which generates a signal when the reflected wave data is outside of a predetermined data range.

4. The system for detecting an object as claimed in claim 3, wherein two flat reflectors are connected to said slotted antenna to limit the aperture of a radiation lobe of the antenna and to direct the waves exiting from the slots towards a predetermined area.

5. The system for detecting an object as claimed in claim 3, wherein the means for comparing the reflected wave data compares the reflected waves with reference data corresponding to the frequency of the transmitted waves.

6. A surveillance system which incorporates a detection system as claimed in claim 3.

7. The surveillance system as claimed in claim 6, which is applied to the surveillance of automatic gates.

8. The surveillance system as claimed in claim 6, which is applied to the surveillance of traveling cranes.

9. The surveillance system as claimed in claim 6, which is applied to road traffic.

* * * * *

UNITED STATES PATENT AND TRADEMARK OFFICE
CERTIFICATE OF CORRECTION

PATENT NO. : 5,424,745
DATED : June 13, 1995
INVENTOR(S) : Paul Fonsny

It is certified that error appears in the above-indentified patent and that said Letters Patent is hereby corrected as shown below:

Title page,
Item [73], Assignee, change "Ccoms" to --Icoms--.

Column 6, Line 51, after "area" insert --;--.

Signed and Sealed this

Twenty-second Day of August, 1995

Attest:

BRUCE LEHMAN

Attesting Officer     Commissioner of Patents and Trademarks